US009773377B2

(12) United States Patent
Nelson et al.

(10) Patent No.: US 9,773,377 B2
(45) **Date of Patent: *Sep. 26, 2017**

(54) GAMING SYSTEM AND METHOD FOR ACCUMULATING AND REDEEMING COMMUNITY GAME TOKENS

(71) Applicant: IGT, Las Vegas, NV (US)

(72) Inventors: Dwayne R. Nelson, Las Vegas, NV (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,060

(22) Filed: Jun. 23, 2016

(65) Prior Publication Data

US 2016/0300445 A1 Oct. 13, 2016

Related U.S. Application Data

(63) Continuation of application No. 14/809,951, filed on Jul. 27, 2015, now Pat. No. 9,378,618, which is a continuation of application No. 14/179,159, filed on Feb. 12, 2014, now Pat. No. 9,098,968.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ...... *G07F 17/3251* (2013.01); *G07F 17/3204* (2013.01); *G07F 17/3211* (2013.01); *G07F 17/3239* (2013.01); *G07F 17/3244* (2013.01); *G07F 17/3295* (2013.01); *G07F 17/34* (2013.01)

(58) Field of Classification Search
USPC ...................... 463/13, 19, 20, 22, 25, 40, 42
See application file for complete search history.

(56) References Cited

U.S. PATENT DOCUMENTS

| | | | | |
|---|---|---|---|---|
| 2,068,379 A | | 1/1937 | Frantz et al. | |
| 4,900,035 A | * | 2/1990 | Carmo | A63F 1/04 273/401 |
| 4,926,327 A | | 5/1990 | Sidley | |
| 5,078,405 A | | 1/1992 | Jones et al. | |
| 5,085,435 A | | 2/1992 | Rossides | |
| 5,116,055 A | | 5/1992 | Tracy | |
| 5,275,400 A | | 1/1994 | Weingardt et al. | |

(Continued)

FOREIGN PATENT DOCUMENTS

| | | |
|---|---|---|
| EP | 1175928 | 1/2002 |
| EP | 1298609 | 4/2003 |

(Continued)

*Primary Examiner* — Adetokunbo O Torimiro
(74) *Attorney, Agent, or Firm* — Neal, Gerber & Eisenberg LLP

(57) ABSTRACT

A gaming system which displays a community game to one or more participating players. During the community game, the gaming system accumulates one or more community game tokens for one or more participating players. The gaming system subsequently assigns a value to each community game token redeemed by each participating player.

23 Claims, 6 Drawing Sheets

(56) References Cited

U.S. PATENT DOCUMENTS 5,280,909 A 1/1994 Tracy
5,324,035 A 6/1994 Morris et al.
5,326,104 A 7/1994 Pease et al.
5,344,144 A 9/1994 Canon
5,393,057 A 2/1995 Marnell
5,417,430 A 5/1995 Breeding
5,511,781 A 4/1996 Wood et al.
5,542,669 A 8/1996 Charron et al.
5,564,700 A 10/1996 Celona
5,564,701 A 10/1996 Dettor
5,580,309 A 12/1996 Piechowiak et al.
5,580,311 A 12/1996 Hoste, III
5,584,485 A 12/1996 Jones et al.
5,611,535 A 3/1997 Tiberio
5,620,182 A 4/1997 Rossides
5,645,486 A 7/1997 Nagao et al.
5,655,961 A 8/1997 Acres et al.
5,664,998 A 9/1997 Seelig et al.
5,681,040 A 10/1997 Peterson
5,697,611 A * 12/1997 Kelly ........................ A63F 7/02 273/126 A
5,702,304 A 12/1997 Acres et al.
5,741,183 A 4/1998 Acres et al.
5,749,784 A 5/1998 Clapper, Jr.
5,752,882 A 5/1998 Acres
5,766,076 A 6/1998 Pease et al.
5,772,509 A 6/1998 Weiss
5,779,544 A 7/1998 Seelig et al.
5,779,547 A 7/1998 SoRelle et al.
5,779,549 A 7/1998 Walker et al.
5,816,918 A 10/1998 Kelly et al.
5,820,459 A 10/1998 Acres et al.
5,830,063 A 11/1998 Byrne
5,836,817 A 11/1998 Acres et al.
5,851,149 A 12/1998 Xidos et al.
5,855,515 A 1/1999 Pease et al.
5,876,283 A 3/1999 Parra et al.
5,876,284 A 3/1999 Acres et al.
5,885,158 A 3/1999 Torango et al.
5,890,963 A 4/1999 Yen
5,947,820 A 9/1999 Morro et al.
5,951,011 A 9/1999 Potter et al.
5,957,775 A 9/1999 Cherry
5,980,384 A 11/1999 Barrie
5,997,002 A 12/1999 Goldman
6,001,016 A 12/1999 Walker et al.
6,015,344 A 1/2000 Kelly et al.
6,033,307 A 3/2000 Vancura
6,050,895 A 4/2000 Luciano, Jr. et al.
6,056,289 A 5/2000 Clapper, Jr.
6,065,752 A 5/2000 Beltran
6,068,553 A 5/2000 Parker
6,077,162 A 6/2000 Weiss
6,089,976 A 7/2000 Schneider et al.
6,089,980 A 7/2000 Gauselmann
6,110,041 A 8/2000 Walker et al.
6,110,043 A 8/2000 Olsen
6,126,542 A 10/2000 Fier
6,142,872 A 11/2000 Walker et al.
6,146,273 A 11/2000 Olsen
6,162,122 A 12/2000 Acres et al.
6,190,255 B1 2/2001 Thomas et al.
6,206,782 B1 3/2001 Walker et al.
6,210,275 B1 4/2001 Olsen
6,217,448 B1 4/2001 Olsen
6,224,482 B1 5/2001 Bennett
6,231,445 B1 5/2001 Acres
6,238,288 B1 5/2001 Walker et al.
6,241,608 B1 6/2001 Torango
6,244,958 B1 6/2001 Acres
6,254,483 B1 7/2001 Acres
6,257,981 B1 7/2001 Acres et al.
6,296,569 B1 10/2001 Congello, Jr.
6,309,300 B1 10/2001 Glavich
6,311,976 B1 11/2001 Yoseloff et al.
6,312,332 B1 11/2001 Walker et al.
6,312,333 B1 11/2001 Acres
6,319,122 B1 11/2001 Packes, Jr. et al.
6,319,125 B1 11/2001 Acres
6,322,309 B1 11/2001 Thomas et al.
6,336,862 B1 1/2002 Byrne
6,358,149 B1 3/2002 Schneider et al.
6,361,441 B1 3/2002 Walker et al.
6,364,765 B1 4/2002 Walker et al.
6,364,768 B1 4/2002 Acres et al.
6,371,852 B1 4/2002 Acres
6,375,567 B1 4/2002 Acres
6,375,568 B1 4/2002 Roffman et al.
6,375,569 B1 4/2002 Acres
6,413,160 B1 7/2002 Vancura
6,416,408 B2 7/2002 Tracy et al.
6,431,983 B2 8/2002 Acres
6,435,511 B1 8/2002 Vancura et al.
6,464,584 B2 10/2002 Oliver
6,503,146 B2 1/2003 Walker et al.
6,565,434 B1 5/2003 Acres
6,565,436 B1 5/2003 Baerlocher
6,572,473 B1 6/2003 Baerlocher
6,575,832 B1 6/2003 Manfredi et al.
6,592,459 B2 7/2003 Parra et al.
6,592,460 B2 7/2003 Torango
6,607,438 B2 8/2003 Baerlocher et al.
6,607,441 B1 8/2003 Acres
6,620,046 B2 9/2003 Rowe
6,626,758 B1 9/2003 Parham et al.
6,632,141 B2 10/2003 Webb et al.
6,648,753 B1 11/2003 Tracy et al.
6,652,378 B2 11/2003 Cannon et al.
6,656,047 B1 12/2003 Tarantino et al.
6,656,048 B2 12/2003 Olsen
6,666,765 B2 12/2003 Vancura
6,676,512 B2 1/2004 Fong et al.
6,692,353 B2 2/2004 Walker et al.
6,692,354 B2 2/2004 Tracy et al.
6,709,330 B1 3/2004 Klein et al.
6,712,697 B2 3/2004 Acres
6,712,699 B2 3/2004 Walker et al.
6,726,563 B1 4/2004 Baerlocher et al.
6,733,390 B2 5/2004 Jorasch et al.
6,743,096 B2 6/2004 Allendorf et al.
6,746,016 B2 6/2004 Perrie et al.
6,749,510 B2 6/2004 Giobbi
6,758,748 B2 7/2004 Byrne
6,761,632 B2 7/2004 Bansemer et al.
6,780,103 B2 8/2004 Bansemer et al.
6,780,105 B1 8/2004 Kaminkow
6,786,824 B2 9/2004 Cannon
6,800,030 B2 10/2004 Acres
6,814,664 B2 11/2004 Baerlocher et al.
6,832,958 B2 12/2004 Acres et al.
6,835,132 B2 12/2004 Bennett
6,837,788 B2 1/2005 Cannon
6,843,724 B2 1/2005 Walker et al.
6,852,027 B2 2/2005 Kaminkow et al.
6,863,606 B1 3/2005 Berg et al.
6,866,584 B2 3/2005 Michaelson
6,869,076 B1 3/2005 Moore et al.
6,869,361 B2 3/2005 Sharpless et al.
6,887,154 B1 5/2005 Luciano, Jr. et al.
6,899,625 B2 5/2005 Luciano, Jr. et al.
6,910,964 B2 6/2005 Acres
6,942,568 B2 9/2005 Baerlocher
RE38,812 E 10/2005 Acres et al.
6,984,174 B2 1/2006 Cannon et al.
6,988,946 B2 1/2006 Michaelson et al.
7,008,319 B2 3/2006 Montgomery et al.
7,018,292 B2 3/2006 Tracy et al.
7,025,674 B2 4/2006 Adams et al.
7,033,270 B2 4/2006 Baerlocher et al.
7,040,982 B1 5/2006 Jarvis et al.
7,048,628 B2 5/2006 Schneider
7,056,215 B1 6/2006 Olive
7,070,505 B2 7/2006 Vancura et al.
7,077,744 B2 7/2006 Cannon

(56) References Cited

U.S. PATENT DOCUMENTS 7,077,746 B2 7/2006 Torango
7,081,050 B2 7/2006 Tarantino
7,086,950 B2 8/2006 Gordon et al.
7,121,943 B2 10/2006 Webb et al.
7,169,041 B2 1/2007 Tessmer et al.
7,175,521 B2 2/2007 McClintic
7,192,348 B2 3/2007 Brosnan et al.
7,223,172 B2 5/2007 Baerlocher et al.
7,291,069 B2 11/2007 Michaelson et al.
7,297,059 B2 11/2007 Vancura et al.
7,300,351 B2 11/2007 Thomas
7,302,412 B1 11/2007 Speck
7,311,598 B2 12/2007 Kaminkow et al.
7,311,604 B2 12/2007 Kaminkow et al.
7,326,115 B2 2/2008 Baerlocher
7,329,183 B2 2/2008 Michaelson et al.
7,351,140 B2 4/2008 Wolf et al.
7,364,510 B2 4/2008 Walker et al.
7,393,276 B2 7/2008 Millerschone
7,393,280 B2 7/2008 Cannon
7,399,227 B2 7/2008 Michaelson et al.
7,416,484 B1 8/2008 Nelson et al.
7,427,236 B2 9/2008 Kaminkow et al.
7,448,949 B2 11/2008 Kaminkow et al.
7,452,270 B2 11/2008 Walker et al.
7,465,226 B2 12/2008 Ikeya et al.
7,470,183 B2 12/2008 Wishart
7,470,187 B2 12/2008 Baerlocher et al.
7,470,188 B2 12/2008 Baerlocher et al.
7,470,189 B2 12/2008 Baerlocher et al.
7,470,190 B2 12/2008 Baerlocher et al.
7,481,430 B1 1/2009 Jackson et al.
7,500,915 B2 3/2009 Wolf et al.
7,513,828 B2 4/2009 Nguyen et al.
7,524,243 B2 4/2009 Bansemer et al.
7,563,163 B2 7/2009 Crumby
7,597,621 B2 10/2009 Baerlocher
7,628,703 B2 12/2009 Wolf et al.
7,651,392 B2 1/2010 Pennington et al.
7,658,672 B1 2/2010 Wolf et al.
7,785,189 B2 8/2010 Brosnan et al.
7,785,194 B2 8/2010 Schneider et al.
7,785,196 B2 8/2010 Baerlocher et al.
7,789,755 B2 9/2010 Davis et al.
7,815,500 B2 10/2010 Montross et al.
7,819,745 B2 10/2010 Cuddy et al.
7,833,093 B2 11/2010 Michaelson et al.
7,837,545 B2 11/2010 Blair, Jr. et al.
7,854,654 B2 12/2010 Baerlocher et al.
7,857,693 B1 12/2010 Johnson et al.
7,857,699 B2 12/2010 Baerlocher
7,892,093 B2 2/2011 Kniesteadt et al.
7,896,734 B2 3/2011 Kaminkow et al.
7,976,389 B2 7/2011 Cannon et al.
8,012,014 B2 9/2011 Low et al.
8,021,230 B2 9/2011 Baerlocher et al.
8,033,912 B2 10/2011 Cannon
8,070,578 B2 12/2011 Michaelson et al.
8,070,587 B2 12/2011 Davis et al.
8,070,593 B2 12/2011 De Waal et al.
8,079,903 B2 12/2011 Nicely et al.
8,087,999 B2 1/2012 Oberberger et al.
8,092,297 B2 1/2012 Decasa, Jr. et al.
8,105,149 B2 1/2012 De Waal
8,109,821 B2 2/2012 Kovacs et al.
8,118,662 B2 2/2012 Caputo et al.
8,118,666 B2 2/2012 Nicely et al.
8,162,666 B2 4/2012 Parham
8,177,633 B2 5/2012 Baerlocher et al.
8,197,334 B2 6/2012 Chudd et al.
8,210,935 B2 7/2012 Caputo et al.
8,231,448 B2 7/2012 Cuddy et al.
8,231,453 B2 7/2012 Wolf et al.
8,292,723 B2 10/2012 De Waal
8,337,295 B2 12/2012 Michaelson et al.
8,371,938 B2 2/2013 Peterson
8,382,572 B2 2/2013 Hoffman et al.
8,393,968 B2 3/2013 Nicely et al.
8,398,475 B2 3/2013 De Waal et al.
8,435,111 B2 5/2013 Filipour et al.
8,475,255 B2 7/2013 Wolf et al.
8,496,519 B2 7/2013 Hoffman et al.
8,500,548 B2 8/2013 Baerlocher et al.
8,512,121 B2 8/2013 MacVittie et al.
2001/0034260 A1 10/2001 Luciano, Jr. et al.
2001/0049298 A1 12/2001 Bennett
2001/0055990 A1 12/2001 Acres
2002/0014821 A1 2/2002 Kobayashi et al.
2002/0132660 A1 9/2002 Taylor
2002/0138594 A1 9/2002 Rowe
2002/0142844 A1 10/2002 Kerr
2002/0151342 A1 10/2002 Tracy et al.
2002/0160826 A1 10/2002 Gomez et al.
2002/0177483 A1 11/2002 Cannon
2002/0183105 A1 12/2002 Cannon et al.
2003/0027625 A1 2/2003 Rowe
2003/0028779 A1 2/2003 Rowe
2003/0036430 A1 2/2003 Cannon
2003/0045350 A1 3/2003 Baerlocher et al.
2003/0060264 A1 3/2003 Chilton et al.
2003/0060266 A1 3/2003 Baerlocher
2003/0060279 A1 3/2003 Torango
2003/0064768 A1 4/2003 Fier
2003/0069058 A1 4/2003 Byrne
2003/0078091 A1 4/2003 Brandstetter et al.
2003/0078101 A1 4/2003 Schneider et al.
2003/0090063 A1 5/2003 Jarvis et al.
2003/0092484 A1 5/2003 Schneider et al.
2003/0100361 A1 5/2003 Sharpless et al.
2003/0119581 A1 6/2003 Cannon et al.
2003/0144965 A1 7/2003 Prasad et al.
2003/0186733 A1 10/2003 Wolf et al.
2003/0190941 A1 10/2003 Byrne
2003/0199306 A1 10/2003 Parker
2003/0199308 A1 10/2003 Parker
2003/0211880 A1 11/2003 Locke
2003/0222402 A1 12/2003 Olive
2003/0228904 A1 12/2003 Acres et al.
2003/0236116 A1 12/2003 Marks et al.
2004/0009811 A1 1/2004 Torango
2004/0053664 A1 3/2004 Byrne
2004/0053681 A1 3/2004 Jordan et al.
2004/0072615 A1 4/2004 Maya et al.
2004/0102238 A1 5/2004 Taylor
2004/0229700 A1 11/2004 Cannon et al.
2004/0242297 A1 12/2004 Walker
2004/0242320 A1 12/2004 Jackson
2005/0020340 A1 1/2005 Cannon
2005/0020342 A1 1/2005 Palmer et al.
2005/0032573 A1 2/2005 Acres et al.
2005/0043082 A1 2/2005 Peterson et al.
2005/0043088 A1 2/2005 Nguyen et al.
2005/0086143 A1 4/2005 Vlazny et al.
2005/0101384 A1 5/2005 Parham
2005/0119047 A1 6/2005 Olive
2005/0143168 A1 6/2005 Torango
2005/0148380 A1 7/2005 Cannon et al.
2005/0153767 A1 7/2005 Gauselmann
2005/0176488 A1 8/2005 Olive
2005/0187014 A1 8/2005 Saffari et al.
2005/0192087 A1 9/2005 Friedman et al.
2005/0209004 A1 9/2005 Torango
2005/0218590 A1 10/2005 O'Halloran et al.
2005/0239542 A1 10/2005 Olsen
2006/0003829 A1 1/2006 Thomas
2006/0025195 A1 2/2006 Pennington et al.
2006/0025203 A1 2/2006 Thomas
2006/0035705 A1 2/2006 Jordan
2006/0040723 A1 2/2006 Baerlocher et al.
2006/0040732 A1 2/2006 Baerlocher et al.
2006/0040733 A1 2/2006 Baerlocher et al.
2006/0040734 A1 2/2006 Baerlocher et al.
2006/0040736 A1 2/2006 Baerlocher et al.
2006/0046821 A1 3/2006 Kaminkow et al.

(56) References Cited

U.S. PATENT DOCUMENTS

2006/0046822 A1 3/2006 Kaminkow et al.
2006/0046823 A1 3/2006 Kaminkow et al.
2006/0068876 A1 3/2006 Kane et al.
2006/0068893 A1 3/2006 Jaffe et al.
2006/0073897 A1 4/2006 Englman et al.
2006/0084499 A1 4/2006 Moshal
2006/0100019 A1 5/2006 Hornik et al.
2006/0111178 A1 5/2006 Gallaway et al.
2006/0119034 A1 6/2006 Bozeman
2006/0135243 A1 6/2006 Englman et al.
2006/0172791 A1 8/2006 Wolf
2006/0189376 A1 8/2006 Hornik et al.
2006/0211472 A1 9/2006 Walker et al.
2006/0247015 A1 11/2006 Walker et al.
2006/0252481 A1 11/2006 Schmit
2006/0259361 A1 11/2006 Barhydt
2006/0287043 A1 12/2006 Englman et al.
2007/0015584 A1 1/2007 Frankel
2007/0054732 A1 3/2007 Baerlocher
2007/0054733 A1 3/2007 Baerlocher et al.
2007/0060317 A1 3/2007 Martin
2007/0060329 A1 3/2007 Martin
2007/0060330 A1 3/2007 Martin
2007/0060369 A1 3/2007 Martin
2007/0077990 A1 4/2007 Cuddy et al.
2007/0105613 A1 5/2007 Adams et al.
2007/0105619 A1 5/2007 Kniestead et al.
2007/0105620 A1 5/2007 Cuddy et al.
2007/0123341 A1 5/2007 Tessmer et al.
2007/0149292 A1 6/2007 Kaminkow et al.
2007/0155465 A1 7/2007 Walker et al.
2007/0155485 A1 7/2007 Cuddy et al.
2007/0167217 A1 7/2007 MacVittie et al.
2007/0298867 A1* 12/2007 Huang .................... G07F 17/32
463/25
2008/0020817 A1 1/2008 Kaminkow et al.
2008/0020822 A1 1/2008 Cuddy et al.
2008/0020823 A1 1/2008 Cuddy et al.
2008/0020824 A1 1/2008 Cuddy et al.
2008/0020825 A1 1/2008 Cuddy et al.
2008/0020829 A1 1/2008 Baerlocher
2008/0020847 A1 1/2008 Kniesteadt et al.
2008/0039194 A1 2/2008 Walther et al.
2008/0045341 A1 2/2008 Englman
2008/0051168 A1 2/2008 Kaminkow et al.
2008/0070676 A1 3/2008 Baerlocher et al.
2008/0070677 A1 3/2008 Baerlocher et al.
2008/0070678 A1 3/2008 Baerlocher et al.
2008/0070702 A1 3/2008 Kaminkow et al.
2008/0081690 A1 4/2008 Baerlocher et al.
2008/0081691 A1 4/2008 Baerlocher et al.
2008/0102916 A1 5/2008 Kovacs et al.
2008/0102920 A1 5/2008 Baerlocher et al.
2008/0108401 A1 5/2008 Baerlocher et al.
2008/0108429 A1 5/2008 Davis et al.
2008/0113765 A1 5/2008 DeWaal
2008/0113768 A1 5/2008 Baerlocher
2008/0113771 A1 5/2008 Baerlocher et al.
2008/0119283 A1 5/2008 Baerlocher
2008/0139274 A1 6/2008 Baerlocher et al.
2008/0139290 A1 6/2008 Kniesteadt et al.
2008/0153564 A1 6/2008 Baerlocher et al.
2008/0161105 A1 7/2008 Mishra
2008/0176630 A1 7/2008 Toyoda
2008/0188296 A1 8/2008 Seelig et al.
2008/0188298 A1 8/2008 Seelig et al.
2008/0200239 A1 8/2008 Gilmore et al.
2008/0234052 A1 9/2008 Steil
2008/0293481 A1 11/2008 Davies
2009/0036202 A1 2/2009 Baerlocher et al.
2009/0042644 A1 2/2009 Zielinski
2009/0042645 A1 2/2009 Graham et al.
2009/0117970 A1 5/2009 De Waal et al.
2009/0124327 A1 5/2009 Caputo et al.
2009/0124362 A1 5/2009 Cuddy et al.
2009/0275410 A1 11/2009 Kisenwether et al.
2010/0120494 A1 5/2010 DeWaal et al.
2010/0120521 A1* 5/2010 Caputo ............... G07F 17/3267
463/26
2010/0137056 A1 6/2010 Hoffman et al.
2010/0184507 A1 7/2010 Gatto et al.
2010/0197379 A1 8/2010 Cannon
2010/0234089 A1 9/2010 Saffari et al.
2011/0003627 A1 1/2011 Nicely et al.
2011/0111827 A1 5/2011 Nicely et al.
2011/0230251 A1 9/2011 Nicely et al.
2012/0108319 A1 5/2012 Caputo et al.
2013/0029757 A1 1/2013 DeWaal
2013/0079088 A1 3/2013 Lafky et al.
2013/0084941 A1 4/2013 Caputo et al.
2013/0196749 A1 8/2013 Kniesteadt et al.

FOREIGN PATENT DOCUMENTS

WO WO 00/32286 6/2000
WO WO 03/049054 6/2003
WO WO 2005/015826 2/2005
WO WO 2005/082480 9/2005
WO WO 2006/005073 1/2006
WO WO 2007/030733 3/2007
WO WO 2007/033000 3/2007
WO WO 2007/040674 4/2007
WO WO 2007/091257 8/2007
WO WO 2007/127259 11/2007
WO WO 2008/021449 2/2008
WO WO 2008/024330 2/2008
WO WO 2008/045398 4/2008
WO WO 2008/048634 4/2008
WO WO 2008/051796 5/2008
WO WO 2008/060978 5/2008

* cited by examiner

FIG. 2

| Player | Average Expected Payback Percentage of EGM played by Player | Quantity of Accumulated Community Game Tokens | Community Game Award | Value of Each Accumulated Community Game Token |
|---|---|---|---|---|
| A | 92% | 5 | 50 | 10 |
| B | 94% | 10 | 150 | 15 |
| C | 96% | 5 | 100 | 20 |

GAMING SYSTEM AND METHOD FOR ACCUMULATING AND REDEEMING COMMUNITY GAME TOKENS

PRIORITY CLAIM

This application is a continuation of, claims the benefit of and priority to U.S. patent application Ser. No. 14/809,951, filed on Jul. 27, 2015, which is a continuation of, claims the benefit of and priority to U.S. patent application Ser. No. 14/179,159, filed on Feb. 12, 2014, now U.S. Pat. No. 9,098,968, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary. That is, different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known secondary or bonus games include a group gaming aspect wherein a plurality of players participate in a group event for one or more bonus awards, such as progressive awards. Certain known gaming machines are configured such that the players of these gaming machines compete for one or more awards. Other known gaming machines are configured such that the players share with each other or can each win one or more awards. These awards are sometimes displayed by one or more secondary display devices above the bank or group of gaming machines.

These types of group or community gaming systems (where the players are competing for awards, where the players are sharing awards, or where the players are winning awards at the same time) continue to grow in popularity. Certain of these group or community gaming systems create an aura of excitement and entertainment for the people playing the gaming machines and for people watching play. There is a continuing need to provide new and different gaming machines and gaming systems which excite and entertain players.

SUMMARY

The present disclosure relates generally to gaming systems and methods for accumulating and redeeming community game tokens.

In various embodiments, the gaming system disclosed herein displays a community game to one or more participating players. During the community game, the gaming system accumulates one or more community game tokens for one or more participating players. An actual value determined for each subsequently redeemed community game token varies from participating player to participating player. That is, in certain embodiments, to account for different players accumulating the same quantity of tokens being provided different community game awards (which are based, at least in part, on such players playing different electronic gaming machines ("EGMs") that utilize different paytables), the gaming system assigns different values to the community game tokens accumulated by different players. In certain other embodiments, to account for determining a community game award for a player prior to determining a quantity of community game tokens accumulated by that player, the gaming system defers assigning any value to any community game tokens until each of such community game tokens are accumulated by that player. In these embodiments, following a completion of the community game, the gaming system assigns a value to each community game token redeemed by each participating player, wherein such assigned values are determined based on a determined community game award to provide to the player. Accordingly, to enable a plurality of players to each participate in a community game while also considering that different players play different EGMs at different wagering amounts and at different rates of play, the gaming system disclosed herein accumulates zero, one or more variable valued community game tokens for such players, wherein an actual value of each player's accumulated community game tokens is determined based on the community game award individually determined for each player. Such a gaming system thus provides players with an interactive community game in which different players at different EGMs each participate in the community game and the community game awards provided to such players (in the form of different valued community game tokens) accounts for the differences between such players and such EGMs.

In operation of various embodiments, upon a suitable triggering event, the gaming system enables a plurality of different players of a plurality of different EGMs to each participate in a play of a community game. In certain embodiments, the gaming system selects one or more players to participate in the community game independent of one or more attributes, parameters or characteristics associated with the player and/or the EGM being played by the player. For example, the gaming system enables any player playing any eligible EGM to participate in the community game wherein the gaming system selects one or more players to participate in the community game regardless of one or more player specific parameters (e.g., a player tracking status of a selected player) and/or one or more EGM specific parameters (e.g., a paytable currently being utilized by an EGM). As such, these embodiments of the gaming system provide a community game wherein different players playing different EGMs each participate in the play of the same community game.

Following the triggering of the community game, the gaming system accumulates one or more community game tokens for one or more participating players in association with the play of the communal game. In certain embodiments, the community game includes a community skill game (or community partial skill game). In these embodiments, one or more participating players make one or more skill-based inputs (as determined based on or quantified by zero, one or more inputs made by the player which tend to measure one or more aspects of that player's skill) to acquire or accumulate one or more community game tokens. It should be appreciated that since a plurality of different players playing a plurality of different EGMs each accumulate zero, one or more community game tokens in the play of the community game and since a value assigned to such community game tokens may vary from player to player, no community displayed value is associated with such accumulated community game tokens. Accordingly, any community display device which displays the tokens accumulated by a plurality of players does not display any values associated with any of the accumulated tokens.

In different embodiments, either prior to the completion of the community game or following the completion of the community game, the gaming system determines, for each individual player, a community game award amount. In certain embodiments, each EGM randomly determines the community game award amount for the specific player of that EGM that is participating in the community game. In one such embodiment, each EGM randomly determines, based on the attributes of that specific EGM and/or the characteristics of the specific player of that EGM, the community game award amount for the specific player of that EGM that is participating in the community game. In certain embodiments, a server determines, for each participating player, the community game award amount for each specific player participating in the community game. In one such embodiment, the server determines for each participating player, based on the attributes of the specifically played EGM and/or the characteristics of the specific participating player, the community game award amount for each specific player participating in the community game. In these embodiments, by accounting for the different attributes of a specifically played EGM and/or the different characteristics of a specific participating player in determining a community game award amount, the gaming system ensures that differently situated players are provided different community game award amounts for their respective participation in a community game.

Following the determination of a community game award amount to provide to each player, the gaming system determines, for each individual player, a value of each accumulated community game token such that a total of the values of a player's accumulated community game tokens matches the community game award amount determined for that player. The gaming system then displays, to each player, the determined community game award amount by displaying the determined value of each community game token accumulated by that player. It should be appreciated that since the parameters of a player's EGM (e.g., a wager amount placed) and/or the characteristics of a player (e.g., a player tracking level) may be at least partially deterministic in the community game award amount the gaming system provides the player in association with a play of the community game, assigning different values to different community game tokens enables such different players to each participate in the community game while providing such different players at such different EGMs equitable awards in association with the play of the community game.

Accordingly, the gaming system disclosed herein provides a multi-player or multi-participant community game wherein players accumulate one or more community game tokens during the play of the community game and wherein the value assigned to each player's community game tokens is determined based on a community game award separately determined for that player. Such configuration thus provides a multi-participant community game wherein different players at different EGMs each participate in the community game and community game tokens are utilized to equate different community game awards for such different players at such different EGMs.

Additional features and advantages are described herein, and will be apparent from the following Detailed Description and the figures.

BRIEF DESCRIPTION OF THE FIGURES

FIG. 2 is an example table of one embodiment of the gaming system disclosed herein illustrating different community game participating players accumulating different quantities of community game tokens associated with different values during the play of the community game.

DETAILED DESCRIPTION

Accumulating and Redeeming Community Game Tokens

In various embodiments, the gaming system disclosed herein displays a community game to one or more participating players. During the community game, the gaming system accumulates one or more community game tokens for one or more participating players. An actual value determined for each subsequently redeemed community game token varies from participating player to participating player. That is, in certain embodiments, to account for different players accumulating the same quantity of tokens being provided different community game awards (which are based, at least in part, on such players playing different electronic gaming machines ("EGMs") that utilize different paytables), the gaming system assigns different values to the community game tokens accumulated by different players.

In certain other embodiments, to account for determining a community game award for a player prior to determining a quantity of community game tokens accumulated by that player, the gaming system defers assigning any value to any community game tokens until each of such community game tokens are accumulated by that player. In these embodiments, following a completion of the community game, the gaming system assigns a value to each community game token redeemed by each participating player, wherein such assigned values are determined based on a determined community game award to provide to the player. Accordingly, to enable a plurality of players to each participate in a community game while also considering that different players play different EGMs at different wagering amounts and at different rates of play, the gaming system disclosed herein accumulates zero, one or more variable valued community game tokens for such players, wherein an actual value of each player's accumulated community game tokens is determined based on the community game award individually determined for each player. Such a gaming system thus provides players with an interactive community game in which different players at different EGMs each participate in the community game and the community game awards provided to such players (in the form of different valued community game tokens) accounts for the differences between such players and such EGMs.

While certain of the embodiments described below are directed to playing a community bonus game or secondary game, it should he appreciated that the present disclosure may additionally or alternatively be employed in association with playing a community base game or primary game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
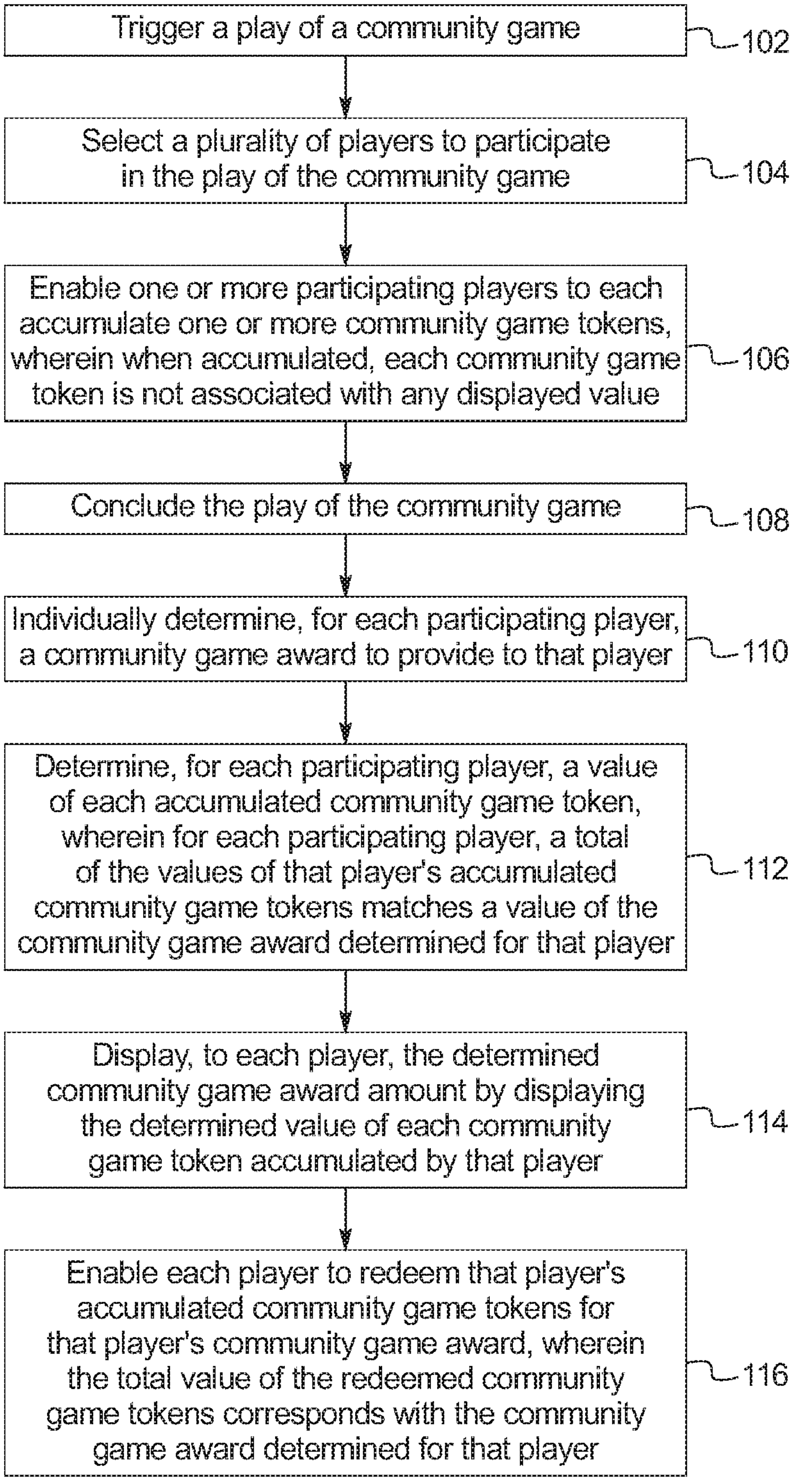
FIG. 1 is a flow chart an example process for operating a gaming system including accumulating zero, one or more community game tokens for one or more players of a community game and redeeming such accumulated community game tokens for community game awards as disclosed herein.

Referring now to FIG. 1, a flowchart of an example embodiment of a process for operating a gaming system disclosed herein is illustrated. In one embodiment, this process is embodied in one or more software programs stored in one or more memories and executed by one or more processors or servers. Although this process is described with reference to the flowchart illustrated in FIG. 1 it should be appreciated that many other methods of performing the acts associated with this process may be used. For example, the order of certain steps described may be changed, or certain steps described may be optional.

In one embodiment, the gaming system triggers a play of a community game as indicated in block 102. In one embodiment, the gaming system triggers a play of a community game based on (or as a result of) one or more displayed events occurring in association with one or more plays of one or more games. In another embodiment, the gaming system triggers a play of a community game independent of any displayed events associated with any plays of any games.

In one embodiment, the community game is a cooperative community game wherein a plurality of players cooperate or play together to accumulate zero, one or more community game tokens. In another embodiment, the community game is a competition community game wherein a plurality of players compete or play against each other to accumulate zero, one or more community game tokens.

In association with the triggering of a play of the community game, the gaming system selects a plurality of players to participate in the play of the community game as indicated in block 104. For example, as seen in FIG. 2, the gaming system selects Player A. Player B and Player C to each participate in the play of the community game. As seen in this example, Player A is currently playing at an EGM which utilizes a paytable having an average expected payback percentage of 92%, Player B is currently playing at an EGM which utilizes a paytable having an average expected payback percentage of 94% and Player C is currently playing at an EGM which utilizes a paytable having an average expected payback percentage of 96%.

Following the triggering of the community game and the selection of a plurality of players to participate in the community game, as indicated in block 106 of FIG. 1, the gaming system enables one or more participating players to each accumulate one or more community game tokens. For example, as seen in FIG. 2, during the play of the community game, Player A accumulates five community game tokens, Player B accumulates ten community game tokens, and Player C accumulates five community game tokens.

As further indicated in block 106 of FIG. 1, when accumulated, each community game token is not associated with any displayed value. That is, since, in one embodiment, a plurality of different players playing a plurality of different EGMs each accumulate zero, one or more community game tokens in the play of the community game and since, as described below, different community game awards may be provided to zero, one or more players, as each community game token is accumulated, no community displayed value is associated with such accumulated community game tokens. In one such embodiment, the gaming system utilizes a community display device to display to the players of the community game and to zero, one or more bystanders, any community game tokens accumulated by zero, one or more players. It should be appreciated that since, as described below, an actual value of each community game token varies from participating player to participating player, the community display device displays the quantity of community game tokens accumulated by zero, one or more participating players without displaying any values associated with any of the accumulated tokens.

In various embodiments, the community game is a skill-based community game (or a partial skill-based community game). In these embodiments, the gaming system determines whether one or more players accumulate zero, one or more community game tokens based on one or more quantifiable skill inputs made by the one or more players in association with the play of the skill-based community game. In these embodiments, the play of the community skill-based game concludes after a designated period of time, after one or more players make a designated quantity of skill-based inputs, after one or more evaluation points and/or after one or more players accumulate each of the community game tokens.

In certain embodiments, the community skill-based game includes a racing game wherein the gaming system displays a game-play environment, such as a race course. In these embodiments, during a competition sequence, such as a race, the gaming system enables a player to navigate an avatar, such as a race car, throughout the game-play environment (by making of one or more quantifiable skill inputs) to win the competition sequence. In these embodiments, the gaming system provides the players zero, one or more community game tokens based on the different skill-based inputs the players make during the competition sequence. For example, different place finishes of the competition sequence are associated with different quantities of accumulated community game tokens (e.g., first place in the race collects ten community game tokens and second place in the race collects nine community game tokens). In another example, zero, one or more players accumulate community game tokens based on the amount of time/distance traveled that the avatars of such players are in different positions or places during the race. In another example, zero, one or more players accumulate community game tokens based on causing the avatar of such players to damage the avatar of other players.

In certain embodiments, the community skill-based game includes a collection game wherein the gaming system displays a game-play environment and enables a player to navigate an avatar throughout the game-play environment (by making of one or more quantifiable skill inputs) to collect or accumulate community game tokens. In other embodiments, the community skill-based game includes a community shooter game, wherein each of a plurality of players is represented by an avatar associated with a shooting device. In one such embodiment, the gaming system enables the plurality of players to each make one or more skill-based inputs (which are each quantifiable and tend to measure a level of skill of each of the players) to shoot one or more targets to determine whether such players accumulate one or more community game tokens. In another such embodiment, the gaming system enables the plurality of players to each make one or more skill-based inputs (which are each quantifiable and tend to measure a level of skill of each of the players) to determine whether such players accumulate one or more community game tokens by determining that the skill-based inputs result in either one of: (i) the avatar that is representative of the first player, shooting at, or eliminating a second, different avatar that is representative of a second, different player participating in the community shooter game, or (ii) the avatar that is representative of the first player being shot, shot at, or eliminated by a second, different avatar that is representative of a second, different player participating in the community shooter game.

It should be appreciated that as described herein, skill includes, but is not limited to: (i) physical skill, such as, but not limited to: timing, aim, physical strength or any combination thereof which is quantifiable by zero, one or more inputs made by the player in association with a skill-based game; (ii) mental skill (i.e., knowledge, reasoning, and/or strategy) which is quantifiable by zero, one or more inputs made by the player in association with a skill-based game; and (iii) any other type of skill which is quantifiable by zero, one or more inputs made by the player in association with a skill-based game. It should be further appreciated that in various embodiments, the player utilizes one or more skill input devices to make one or more quantifiable skill inputs. Examples of skill input devices include, but are not limited to: joysticks, buttons, a mouse or a plurality of mice, one or more trackballs, one or more pointing devices, one or more bodily motion trackers such as motion sensing devices for human-computer interaction, touchpads, touchscreens, one or more controllers with: (1) one or more motion sensing devices, (2) one or more proximity sensing devices, (3) one or more force sensing devices (transducers), (4) one or more accelerometers, or any other suitable skill input devices.

In another embodiment, the gaming system randomly accumulates one or more community game tokens for zero, one or more participating players of the community game. In one such embodiment, the gaming system accumulates zero, one or more community game tokens for zero, one or more players based on (or as a result of) one or more displayed events occurring in association with the play of the community game. In another such embodiment, the gaming system accumulates zero, one or more community game tokens for zero, one or more players independent of any displayed events associated with the play of the community game.

Following the accumulation of zero, one or more community game tokens for zero, one or more players participating in the play of the community game, the gaming system concludes the play of the community game as indicated in block 108 of FIG. 1. In different embodiments, the gaming system concludes the play of the community game after a designated period of time, after a designated quantity of events occur in association with the play of the community game and/or after one or more players accumulate each of the community game tokens.

In various embodiments, following the conclusion of the community game, the gaming system individually determines, for each participating player, a community game award to provide to that player as indicated in block 110. In these embodiments, since the gaming system determines different community game awards for different participating players of the community game and since a plurality of players may each have the same quantity of accumulated bonus community tokens, the determination of each players community game award occurs independent of the quantity of community game tokens accumulated for that player. For example, as seen in FIG. 2, the gaming system determines: (i) a community game award of fifty for Player A, (ii) a community game award of one-hundred-fifty for Player B, and (iii) a community game award of one-hundred for Player C.

In various embodiments, prior to the conclusion of the community game (i.e., before the play of the community game or during the play of the community game), the gaming system determines, for each participating player, a community game award to provide to that player. In these embodiments, since the gaming system determines different community game awards for different participating players of the community game and since the quantity of community game tokens each player accumulates during the community game is unknown until the conclusion of the community game, the determination of each players community game award occurs independent of the quantity of community game tokens accumulated for that player. In one such embodiment which includes determining the community game award for each player prior to the conclusion of the community game, the gaming system causes each EGM to display a value of each community game token as such community game token is accumulated. It should be appreciated that in one embodiment, since the community game award is determined prior to the conclusion of the play of the community game and thus does not change based on the play of the community game, as a player accumulates more community game tokens, the gaming system modifies the value of one or more previously accumulated community game tokens.

Returning to FIG. 1, following the conclusion of the community game and following the determination of the community game award to provide to each player, the gaming system determines, for each participating player, a value of each accumulated community game token as indicated in block 112. As further indicated in block 112, for each participating player, a total of the values of that player's accumulated community game tokens matches a value of the community game award determined for that player.

For example, as seen in FIG. 2, since Player A accumulated five community game tokens during the play of the community game and since the gaming system determined a community game award of fifty for Player A, the gaming system determined that each community game token which Player A accumulated has a value of ten. In this example, as also seen in FIG. 2, since Player B accumulated ten community game tokens during the play of the community game and since the gaming system determined a community game award of one-hundred-fifty for Player B, the gaming system determined that each community game token which Player B accumulated has a value of fifteen. As further seen in FIG. 2, in this example, since Player C accumulated five community game tokens during the play of the community game and since the gaming system determined a community game award of one-hundred for Player C, the gaming system determined that each community game token which Player C accumulated has a value of twenty. It should be appreciated that as illustrated in this example, since Player A and Player C each accumulated the same quantity of community game tokens, but the gaming system determined different community game awards for Player A and Player C, the community game tokens accumulated by Player A and Player C have different values.

In one embodiment, one or more central servers, central controllers, or remote hosts randomly determine a community game award for each participating player. In one such embodiment, for each participating player, the remote host determines a community game award and communicates that community game award to the EGM of that participating player. In this embodiment, each EGM then determines, based on the quantity of community game tokens accumulated by the player of that EGM and the received community game award for that player, a value of each community game token accumulated by that player (wherein a total of the values of a player's accumulated community game tokens matches a value of the community game award determined for that player). In another such embodiment, for each participating player, the remote host determines a community game award and determines, based on the quantity of community game tokens accumulated by a player and the determined community game award for that player, a value of each community game token accumulated by that player (wherein a total of the values of a player's accumulated community game tokens matches a value of the community game award determined for that player). In this embodiment, the gaming system then communicates, for each participating player, the community game award and the value of each accumulated community game token to the EGM of that participating player.

In different embodiments, the remote host determines, either before, during or after the play of the community game, a community game award for each player independent of the play of the community game and independent of any quantity of community game tokens accumulated by any player. In one embodiment, the remote host determines, for each participating player, a community game award based, at least in part, on the parameters, attributes or characteristics of the participating player and/or the EGM being played by the participating player. In one such embodiment, the remote host determines, based, at least in part, on the paytable employed by a particular EGM, a community game award to provide to the player of that EGM. For example, as seen in FIG. 2, based, at least in part, on the EGM of Player C having an average expected payback percentage higher than an average expected payback percentage of the EGM of Player A, the gaming system determines a higher community game award for Player C than Player A. Accordingly, in this embodiment, to enable a plurality of players to each participate in a community game while also considering that different players play different EGMs at different wagering amounts and at different rates of play, the remote host accumulates zero, one or more variable valued community game tokens for such players, wherein an actual value of each player's accumulated community game tokens is determined, at least in part, based on one or more parameters or characteristics associated with that player and/or the EGM played by that player.

In another embodiment, each EGM determines a community game award for the participating player of that EGM. In this embodiment, following the determination of a community game award, the EGM determines based on the quantity of community game tokens accumulated by the player of that EGM and the determined community game award, a value of each community game token accumulated by that player (wherein a total of the values of a player's accumulated community game tokens matches a value of the community game award determined for that player).

In different embodiments, each EGM determines, either before, during or after the play of the community game, a community game award for a player independent of the play of the community game and independent of any quantity of community game tokens accumulated by the player of that EGM. In one embodiment, the EGM determines, for the participating player of that EGM, a community game award based, at least in part, on the parameters, attributes or characteristics of the participating player and/or that EGM. In one such embodiment, an EGM determines, based, at least in part, on the paytable employed by that EGM, a community game award to provide to the player of that EGM. Accordingly, in this embodiment, to enable a plurality of players to each participate in a community game while also considering that different players play different EGMs at different wagering amounts and at different rates of play, the EGMs accumulate zero, one or more variable valued community game tokens for such players, wherein an actual value of each player's accumulated community game tokens is determined, at least in part, based on one or more parameters or characteristics associated with that player and/or the EGM.

Following the determination of a value of each community game token accumulated by each participating player, as indicated in block 114 of FIG. 1, the gaming system displays, to each player, the determined community game award amount by displaying the determined value of each community game token accumulated by that player. As seen in block 116, the gaming system then enables each player to redeem that player's accumulated community game tokens for that player's community game award, wherein the total value of the redeemed community game tokens corresponds with the value of the community game award determined for that player.

Accordingly, it should be appreciated that as described above, in certain embodiments, since the parameters of a player's EGM (e.g., a wager amount placed) and/or the characteristics of a player (e.g., a player tracking level) may be at least partially deterministic in the community game award amount the gaming system provides the player in association with a play of the community game, assigning different values to different community game tokens enables such different players to each participate in the community game while providing such different players at different EGMs equitable awards in association with the play of the community game. That is, the gaming system of the present disclosure utilizes variable valued community game tokens to enable a plurality of different players playing different EGMs to participate in a community game, wherein the awards provided to such players in association with the play of the community game are each specific to the different players playing such different EGMs.

In one embodiment wherein the community game is a community skill game, the gaming system utilizes a minimum quantity of community game tokens each player accumulates and/or a maximum quantity of community game tokens each player accumulates. In this embodiment, to ensure that each community game token is associated with a value greater than zero, the gaming system employs minimum and maximum quantities of accumulated community game tokens. In one such embodiment, to prevent collusion among participating players, the minimum and maximum quantities of accumulated community game tokens are employed keep the community game tokens provided in the community game within a designated average expected payback percentage range. In another such embodiment and to further prevent collusion among participating players, the gaming system maintains a plurality of community games wherein after selecting a player to participate in a community game, the gaming system randomly selects one of the plurality of community games for the selected player to participate in.

In one embodiment, the gaming system enables zero, one or more players to redeem any accumulated community game tokens upon the conclusion of the community game. In another embodiment, the gaming system enables zero, one or more players to redeem any accumulated community game tokens at a designated time or during a designated period of time.

In different embodiments, one or more awards provided in association with one or more primary game plays, one or more secondary game plays, and/or one or more community game plays include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one electronic gaming machine to display the community game and/or any community game tokens accumulated by zero, one or more players. In another embodiment, in addition or in alternative to each electronic gaming machine displaying the community game and/or any community game tokens accumulated by zero, one or more players, the gaming system causes one or more community or overhead display devices to display part or all of the community game and/or any community game tokens accumulated by zero, one or more players to one or more other players or bystanders either at a gaming establishment or viewing over a network, such as the internet. In another embodiment, in addition or in alternative to each electronic gaming machine displaying the community game and/or any community game tokens accumulated by zero, one or more players, the gaming system causes one or more internet sites to each display the community game and/or any community game tokens accumulated by zero, one or more players such that a player is enabled to log on from a personal web browser. In another such embodiment, the gaming system enables the player to play one or more games on one device while viewing the community game and/or any community game tokens accumulated by zero, one or more players from another device, such as a desktop or laptop computer.

In different embodiments, a community game triggering event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons to the players for an occurrence of a community game triggering event. In these embodiments, such determinations are not triggered by an event in a primary game or based specifically on any of the plays of any primary games. That is, these events occur without any explanation or alternatively with simple explanations.

In one such embodiment, a community game triggering event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a community game triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a community game triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a community game triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a community game triggering event occurs based on a predefined variable reaching a defined parameter threshold. For example, when the 500,000$^{th}$ player has played an electronic gaming machine (ascertained from a player tracking system), one or more of such events or conditions occur. In different embodiments, the predefined parameter thresholds include a length of time, a length of time after a certain dollar amount is hit, a wager level threshold for a specific device (which electronic gaming machine is the first to contribute $250,000), a number of electronic gaming machines active, or any other parameter that defines a suitable threshold.

In different embodiments, a community game triggering event occurs based on a quantity of games played. In this embodiment, a quantity of games played is set for when one or more of such events or conditions will occur. In one embodiment, such a set quantity of games played is based on historic data.

In different embodiments, a community game triggering event occurs based on time. In this embodiment, a time is set for when one or more of such events or conditions will occur. In one embodiment, such a set time is based on historic data.

In different embodiments, a community game triggering event occurs based upon gaming system operator defined player eligibility parameters stored on a player tracking system (such as via player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the electronic gaming machine. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a community game triggering event occurs based on a system determination, including one or more random selections by the central controller. In one embodiment, as described above, the gaming system tracks all active electronic gaming machines and the wagers they placed. In one such embodiment, based on the electronic gaming machine's state as well as one or more wager pools associated with the electronic gaming machine, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a community game triggering event occurs based on a determination of if any numbers allotted to an electronic gaming machine match a randomly selected number. In this embodiment, upon or prior to each play of each electronic gaming machine, an electronic gaming machine selects a random number from a range of numbers and during each primary game, the electronic gaming machine allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a community game triggering event to occur may be implemented in accordance with the gaming system and method disclosed herein.

It should be appreciated that one or more of the above-described triggers pertaining to one or more of such triggering events occurring may be combined in one or more different embodiments.

In one embodiment, the gaming system determines which players to participate in a triggered community game based on a displayed event in a play of one or more displayed games. In another embodiment, the gaming system tracks the occurrences of one or more suitable events occurring at or in association with one or more players and/or one or more games and determines, based on these tracked events, which players to participate in the community game. In another embodiment, the gaming system defines one or more game play parameters, wherein the gaming system determines which players to participate in the community game based on a player's tracked game play activity satisfying the defined parameter.

In another embodiment, the gaming system determines which players to participate in a triggered community game independent of any displayed event in any play of any game. In one such embodiment, the gaming system determines which players to participate in the community game based on the respective relative total amounts wagered on each of the EGMs during a community game eligibility time period associated with a play of the community game. In this embodiment, for a play of a community game, the gaming system determines the relative percentages of total amounts wagered for each of the EGMs by determining the amount wagered at each EGM in relation to the total amount wagered at all EGMs during the community game eligibility time period. The gaming system of this embodiment then uses these relative percentages determined for each EGM to randomly determine which of the EGMs will be selected to play the community game.

In one embodiment, the gaming system determines which players to participate in a triggered community game independent of one or more parameters or characteristics of such players and/or the EGMs played by such players. In one such embodiment, the gaming system randomly selects one or more players to participate in the community game regardless of any parameters or characteristics of such players and/or the EGMs played by such players. Such an embodiment enables different players (e.g., players of different player tracking statuses) playing different games (e.g., games played at different wager amounts and/or games that employ different paytables) to each participate in a community game.

In another embodiment, the gaming system determines which players to participate in a triggered community game based on one or more parameters or characteristics of such players and/or the EGMs played by such players. In one such embodiment, the gaming system determines a probability of each player being selected to participate in the community game wherein different players have different probabilities based on one or more parameters or characteristics of such players and/or the EGMs played by such players. In this embodiment, the gaming system selects which players to participate in the community game based on these determined probabilities. For example, the gaming system determines that players placing higher wager amounts to play one or more primary games have a higher probability of being selected to participate in the community game than players placing lower wager amounts to play one or more primary games. In another example, the gaming system determines that players associated with a first player tracking status have a higher probability of being selected to participate in the community game than players associated with a second, lower player tracking status. In another example, the gaming system determines that players currently playing EGMs of a first denomination have a higher probability of being selected to participate in the community game than players currently playing EGMs of a second, lower denomination.

In different embodiments, one or more community games include, but are not limited to:

i. a play of any suitable community slot game;
ii. a play of any suitable community free spins or community free game activations;
iii. a play of any suitable community wheel game;
iv. a play of any suitable community card game;
v. a play of any suitable community offer and acceptance game;
vi. a play of any suitable community award ladder game;
vii. a play of any suitable community puzzle-type game;
viii. a play of any suitable community persistence game;
ix. a play of any suitable community selection game;
x. a play of any suitable community cascading symbols game;
xi. a play of any suitable community ways to win game;
xii. a play of any suitable community scatter pay game;
xiii. a play of any suitable community coin-pusher game;
xiv. a play of any suitable community elimination game;
xv. a play of any suitable community stacked wilds game;
xvi. a play of any suitable community trail game;
xvii. a play of any suitable community bingo game;
xviii. a play of any suitable community video scratch-off game;
xix. a play of any suitable community pick-until-complete game;
xx. a play of any suitable community shooting simulation game;
xxi. a play of any suitable community racing game;
xxii. a play of any suitable community promotional game;
xxiii. a play of any suitable community high-low game;
xxiv. a play of any suitable community lottery game;
xxv. a play of any suitable community number selection game;
xxvi. a play of any suitable community dice game;
xxvii. a play of any suitable community skill game;
xxviii. a play of any suitable community auction game;
xxix. a play of any suitable community reverse-auction game;
xxx. a play of any suitable community game in a service window;
xxxi. a play of any suitable community game on a mobile device; and/or
xxxii. a play of any suitable game disclosed herein;

In another embodiment, the community game includes a plurality of rounds or phases. In this embodiment, the gaming system individually determines zero, one or more community game awards for one or more rounds of the community game. For each player of each round of the community game, upon the conclusion of that round, the gaming system determines a value of each community game token that player accumulated during that round, wherein a total value of each of that player's accumulated gaming tokens for that round matches a value of the community game award determined for that player for that round.

Alternative Embodiments

It should be appreciated that in different embodiments, one or more of:

i. whether to trigger a community game;
ii. when a community game is triggered;
iii. which players are selected to participate in the community game;
iv. whether to trigger a community skill-based game;
v. whether to trigger a partial skill-based community game;
vi. what type of skill-based community game (or partial skill-based community game) to trigger;
vii. which type of skill to associate with the skill-based community game (or partial skill-based community game);
viii. which type of player skill inputs to enable one or more players to make;
ix. a quantity of player skill inputs to enable one or more players to make;
x. one or more amounts of time allotted for a play of a skill-based community game (or partial skill-based community game);
xi. a community game award to provide to a player participating in a community game;
xii. a quantity of community game tokens one or more players accumulate;
xiii. a value of one or more community game tokens;
xiv. when one or more community game tokens are redeemable by a player; and/or
xv. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection or input, determined independent of a player's selection or input, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
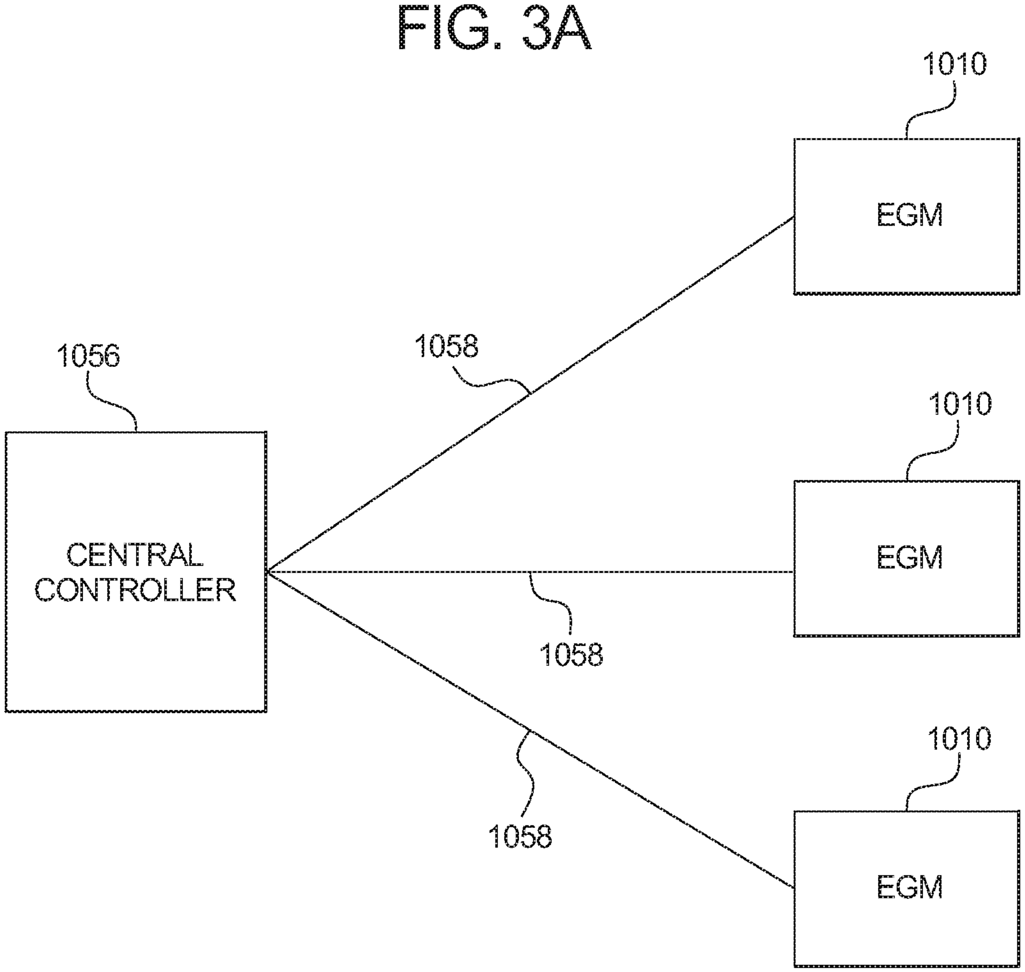
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IF address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
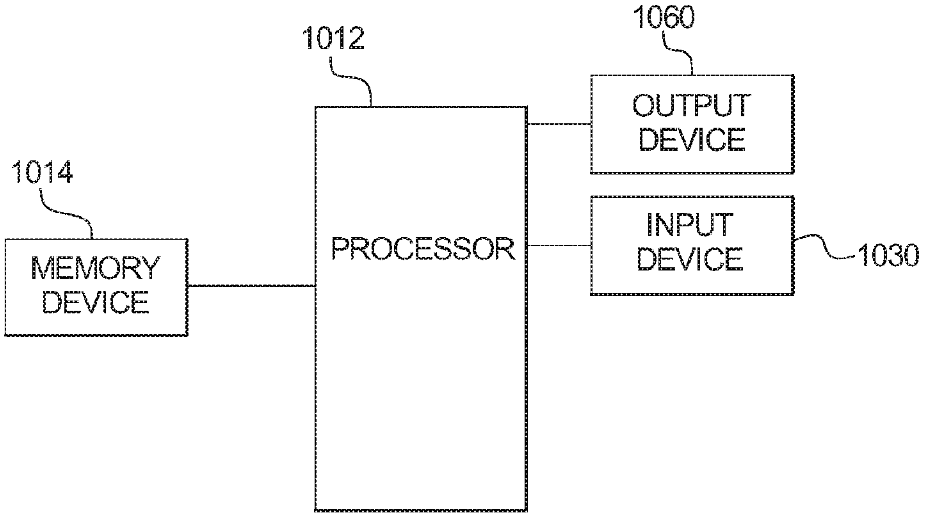
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CO ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
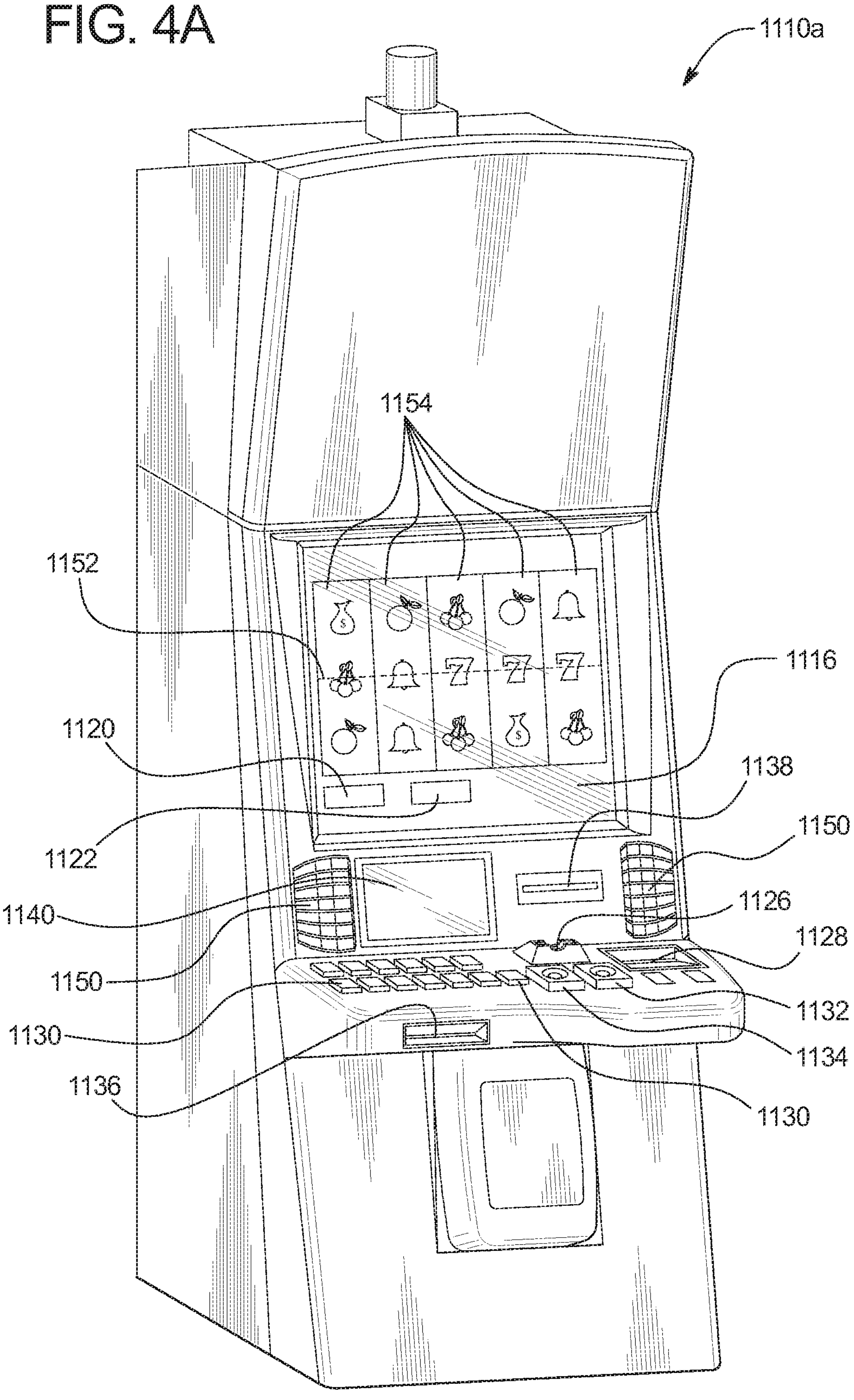
FIGS. 4A and 4B are perspective views of example alternative embodiments of the gaming system disclosed herein.
Figure 4B:
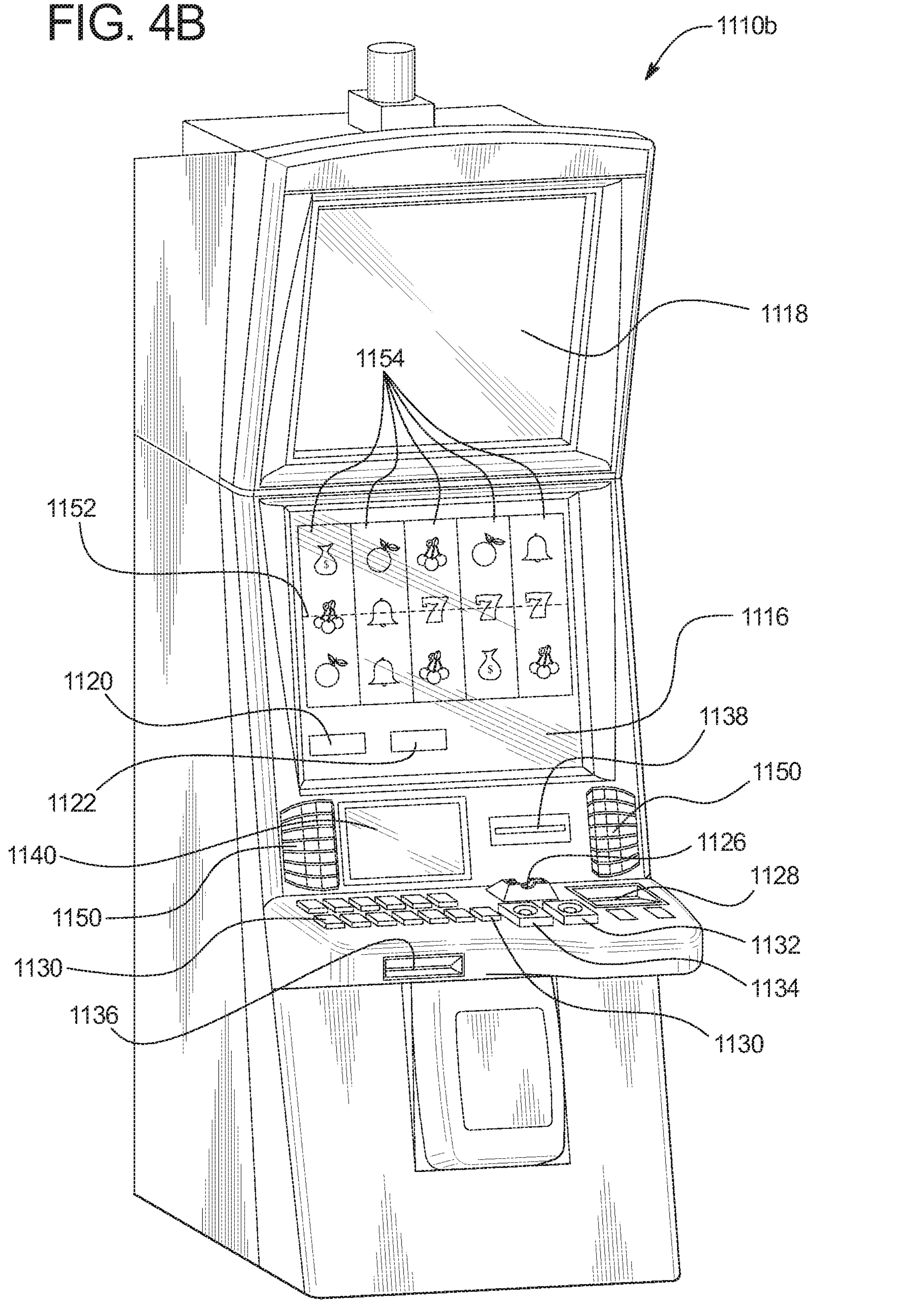

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels. SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S.

Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

a plurality of input devices including an acceptor;

at least one processor; and at least one memory device which stores a plurality of instructions, which when executed by the at least one processor, cause the at least one processor to:

responsive to a physical item being received via the acceptor, establish a credit balance based, at least in part, on a monetary value associated with the received physical item, enable a player to place a wager amount on a play of a wagering game, for the play of the wagering game:

determine a wagering game outcome, cause the at least one display device to display the determined wagering game outcome, determine any wagering game award associated with the displayed wagering game outcome, and cause the at least one display device to display any determined wagering game award, upon an occurrence of a secondary game triggering event, cause the at least one display device to display a triggered play of a secondary game, for the displayed triggered play of the secondary game:

accumulate a quantity of at least one secondary game token, wherein when accumulated, each of the quantity of at least one secondary game token is not associated with any value, and determine a secondary game award, wherein said secondary game award is determined independent of any accumulated secondary game tokens, determine a value associated with each accumulated secondary game token, wherein said determination is based on the determined secondary game award and the accumulated quantity of at least one secondary game token, cause the at least one display device to display the determined value associated with each accumulated secondary game token, enable the player to redeem, via the at least one input device, the accumulated quantity of at least one secondary game token for the determined secondary game award, and responsive to a cashout input being received, cause an initiation of any payout associated with the credit balance.

2. The gaming system of claim 1, wherein the secondary game includes a skill-based secondary game.

3. The gaming system of claim 2, wherein the quantity of accumulated secondary game tokens is based, at least in part, on at least one quantifiable skill input made by the player in association with the skill-based secondary game.

4. The gaming system of claim 3, wherein the at least one quantifiable skill input is selected from the group consisting of: at least one quantifiable input of a mental skill, and at least one quantifiable input of a physical skill.

5. The gaming system of claim 1, wherein when executed by the at least one processor, the plurality of instructions cause the at least one processor to determine the secondary game award based on at least one selected from the group consisting of: at least one player attribute associated with the player and at least one game attribute associated with the play of the wagering game.

6. The gaming system of claim 1, wherein when executed by the at least one processor, the plurality of instructions cause the at least one processor to determine the secondary game award prior to a conclusion of the triggered secondary game.

7. The gaming system of claim 1, wherein when executed by the at least one processor, the plurality of instructions cause the at least one processor to cause the at least one display device to display the accumulated quantity of at least one secondary game token without displaying any value associated with each accumulated secondary game token.

8. The gaming system of claim 1, wherein at least one of any determined wagering game award and the determined secondary game award is at least one selected from the group of: a quantity of monetary credits, a quantity of non-monetary credits, a quantity of promotional credits, and a quantity of player tracking points.

9. A gaming system server comprising:

at least one processor; and at least one memory device which stores a plurality of instructions, which when executed by the at least one processor, cause the at least one processor to:

receive data representing a wager placed in association with a play of a wagering game, wherein a credit balance is decreasable based on the wager placed in association with the play of the wagering game, said credit balance being increasable via an acceptor of a physical item associated with a monetary value, and said credit balance being decreasable via a cashout device, for the play of the wagering game:

determine a wagering game outcome, cause a display of the determined wagering game outcome by at least one display device, determine any wagering game award associated with the displayed wagering game outcome, and cause a display of any determined wagering game award by the at least one display device, wherein the credit balance is increasable based on any determined wagering game award, upon an occurrence of a secondary game triggering event, cause a display of a triggered play of a secondary game by the at least one display device, for the triggered play of the secondary game:

accumulate a quantity of at least one secondary game token, wherein when accumulated, each of the quantity of at least one secondary game token is not associated with any value, and determine a secondary game award, wherein said secondary game award is determined independent of any accumulated secondary game tokens, determine a value associated with each accumulated secondary game token, wherein said determination is based on the determined secondary game award and the accumulated quantity of at least one secondary game token, cause a display, by the at least one display device, of the determined value associated with each accumulated secondary game token, and receive data representing at least one player input to redeem the accumulated quantity of at least one secondary game token for the determined secondary game award.

10. The gaming system server of claim 9, wherein the secondary game includes a skill-based secondary game.

11. The gaming system server of claim 10, wherein the quantity of accumulated secondary game tokens is based, at least in part, on at least one quantifiable skill input made by a player in association with the skill-based secondary game.

12. The gaming system server of claim 11, wherein the at least one quantifiable skill input is selected from the group consisting of: at least one quantifiable input of a mental skill, and at least one quantifiable input of a physical skill.

13. The gaming system server of claim 9, wherein when executed by the at least one processor, the plurality of instructions cause the at least one processor to determine the secondary game award based on at least one selected from the group consisting of: at least one player attribute associated with a player and at least one game attribute associated with the play of the wagering game.

14. The gaming system server of claim 9, wherein when executed by the at least one processor, the plurality of instructions cause the at least one processor to determine the secondary game award prior to a conclusion of the triggered secondary game.

15. The gaming system server of claim 9, wherein when executed by the at least one processor, the plurality of instructions cause the at least one processor to cause the at least one display device to display the accumulated quantity of at least one secondary game token without displaying any value associated with each accumulated secondary game token.

16. The gaming system server of claim 9, wherein at least one of any determined wagering game award and the determined secondary game award is at least one selected from the group of: a quantity of monetary credits, a quantity of non-monetary credits, a quantity of promotional credits, and a quantity of player tracking points.

17. The gaming system server of claim 9, which transmits and receives data over a data network.

18. The gaming system server of claim 17, wherein the data network is an internet.

19. A gaming system server comprising:

at least one processor; and at least one memory device which stores a plurality of instructions, which when executed by the at least one processor, cause the at least one processor to:

receive data representing a wager placed in association with a play of a wagering game, for the play of the wagering game:

determine a wagering game outcome, cause a display of the determined wagering game outcome by at least one display device of a mobile device, determine any wagering game award associated with the displayed wagering game outcome, and cause a display of any determined wagering game award by the at least one display device of the mobile device, upon an occurrence of a secondary game triggering event, cause a display of a triggered play of a secondary game by the at least one display device of the mobile device, for the triggered play of the secondary game:

accumulate a quantity of at least one secondary game token, wherein when accumulated, each of the quantity of at least one secondary game token is not associated with any value, and determine a secondary game award, wherein said secondary game award is determined independent of any accumulated secondary game tokens, determine a value associated with each accumulated secondary game token, wherein said determination is based on the determined secondary game award and the accumulated quantity of at least one secondary game token, cause a display, by the at least one display device of the mobile device, of the determined value associated with each accumulated secondary game token, and receive data representing at least one player input to redeem the accumulated quantity of at least one secondary game token for the determined secondary game award.

20. The gaming system server of claim 19, wherein the secondary game includes a skill-based secondary game.

21. The gaming system server of claim 20, wherein the quantity of accumulated secondary game tokens is based, at least in part, on at least one quantifiable skill input made by a player in association with the skill-based secondary game.

22. The gaming system server of claim 21, wherein the at least one quantifiable skill input is selected from the group consisting of: at least one quantifiable input of a mental skill, and at least one quantifiable input of a physical skill.

23. The gaming system server of claim 19, wherein at least one of any determined wagering game award and the determined secondary game award is at least one selected from the group of: a quantity of monetary credits, a quantity of non-monetary credits, a quantity of promotional credits, and a quantity of player tracking points.

* * * * *